United States Patent [19]

Osifchin

[11] Patent Number: 5,398,485
[45] Date of Patent: Mar. 21, 1995

[54] BOTTLE SUPPORT MECHANISM FOR A CAPPING MACHINE

[75] Inventor: John T. Osifchin, Delafield, Wis.
[73] Assignee: H & K Inc., Waukesha, Wis.
[21] Appl. No.: 220,827
[22] Filed: Mar. 31, 1994
[51] Int. Cl.[6] .......................... B65B 7/28; B67B 3/20; B65G 17/34
[52] U.S. Cl. ........................... 53/490; 53/317; 53/331.5; 53/367; 198/803.9; 198/803.14
[58] Field of Search .................. 53/490, 281, 282, 317, 53/331.5, 367, 368, 369; 198/699.1, 688.1, 803.14, 803.15, 803.9, 692

[56] References Cited

U.S. PATENT DOCUMENTS

| | | | |
|---|---|---|---|
| 1,279,413 | 9/1918 | Norton | 53/367 X |
| 3,576,247 | 4/1971 | Caulford | 198/803.14 X |
| 3,771,284 | 11/1973 | Boeckmann et al. | 53/331.5 X |
| 4,120,135 | 10/1978 | Baldyga | 53/367 X |
| 4,143,754 | 3/1979 | Eldred | 198/803.9 X |
| 4,266,656 | 5/1981 | Richard | 198/803.14 |
| 4,765,119 | 8/1988 | Aldlin et al. | 53/308 |
| 4,939,890 | 7/1990 | Peronek et al. | 53/486 |
| 5,160,019 | 11/1992 | Temming | 198/803.9 |
| 5,224,586 | 7/1993 | Naka et al. | 198/803.14 X |

Primary Examiner—Horace M. Culver
Attorney, Agent, or Firm—Andrus, Sceales, Starke & Sawall

[57] ABSTRACT

A bottle support construction for a capping machine comprising a rotatable table having a series of circumferentially spaced openings. A plurality of bottles are conveyed onto the table with each bottle being positioned in registry with an opening. The bottles, preferably composed of plastic, have a cavity in their lower surfaces with each cavity containing one or more radial groves. A chuck is mounted for vertical movement within each opening in the table from a lower non-chucking position to an upper chucking position where the chuck engages the cavity in the bottle. The chuck is provided with one or more radial ribs which engage the grooves in the cavity of the bottle to lock the bottle against rotation while a cap is threaded on the neck of the bottle. The chuck is moved between the lower and upper chucking positions by cam mechanism in which a follower is mounted on the lower end of a rod attached to the chuck and the follower rides on an inclined cam surface as the table rotates to move the chuck between the lower and upper positions.

14 Claims, 2 Drawing Sheets

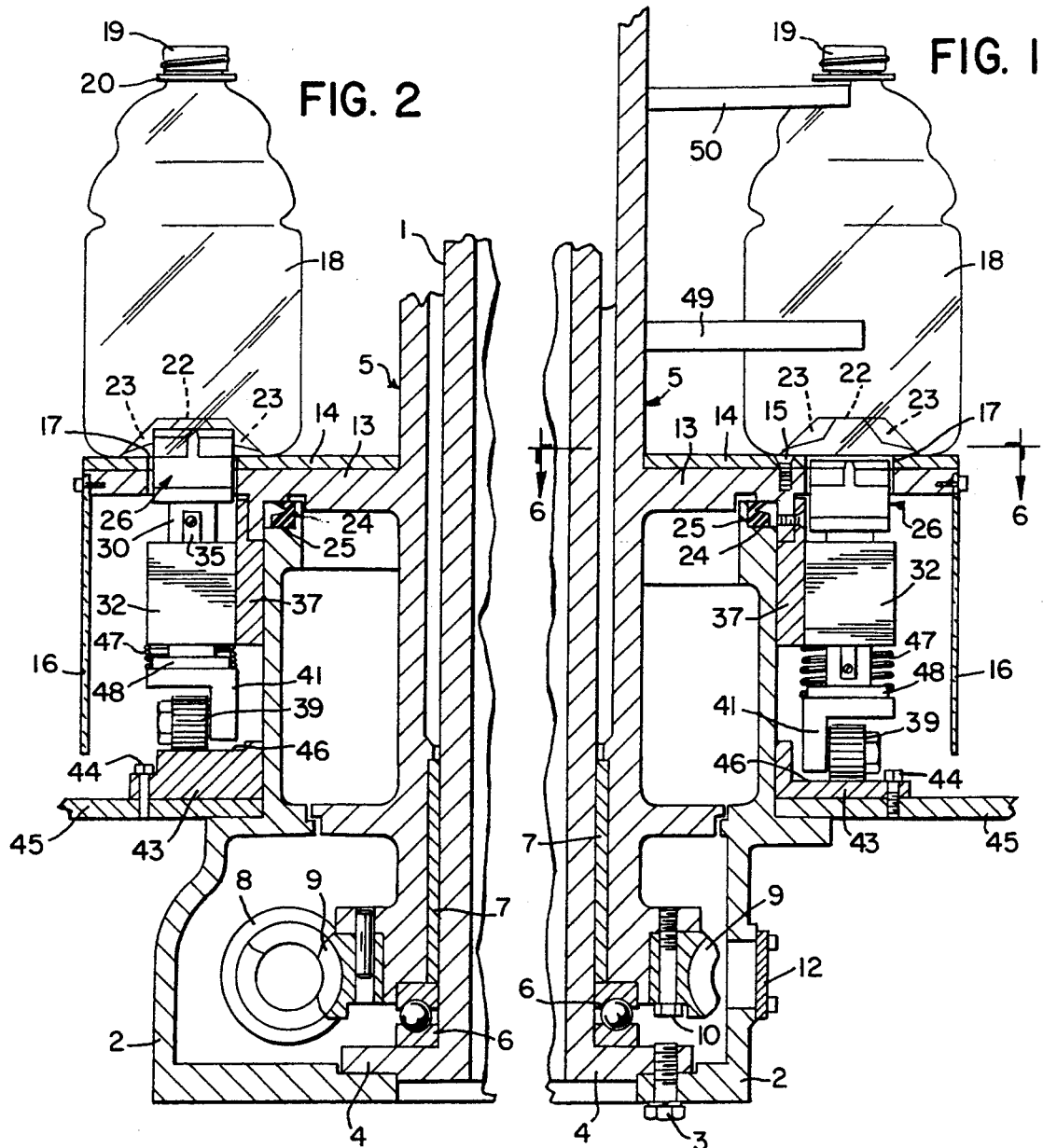
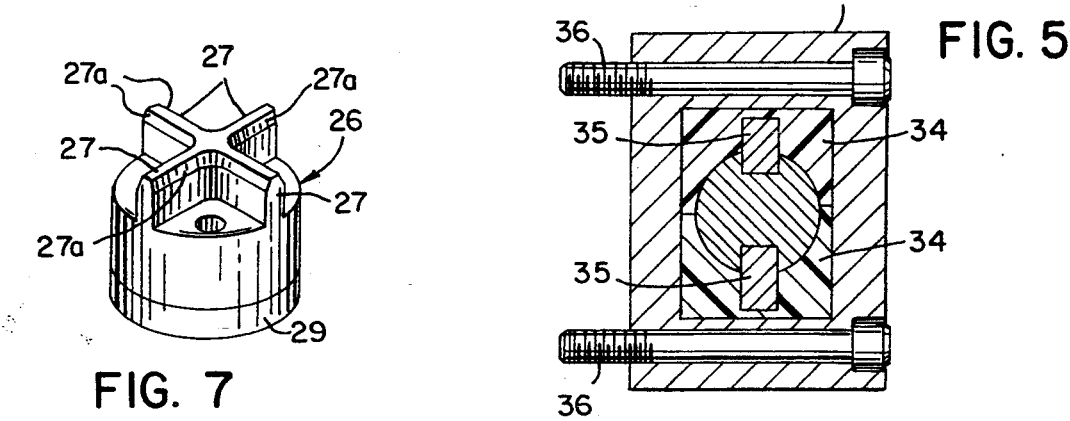

BOTTLE SUPPORT MECHANISM FOR A CAPPING MACHINE

BACKGROUND OF THE INVENTION

Plastic and glass bottles are commonly employed to contain liquids such as soda, juice, cleaning compositions, and the like. After the bottles are filled with the liquid by an automatic filling machine, the bottle is capped by a capping machine that screws a threaded cap onto the upper end or neck of the bottle.

In a typical capping machine, a series of bottles are supported on a rotating table and as the table rotates, the bottles are moved sequentially through a number of work stations. The bottles are maintained in position on the table by engagement of each bottle neck with recess or notch in a star guide. The star guide engages the neck of the bottle beneath an annular flange or rim on the bottle neck.

To prevent rotation of the bottle during capping, a pair of knife blades are mounted adjacent each notch in the star guide and face upwardly. The blades are adapted to engage the lower surface of the flange on the bottle neck. When downward pressure is applied to the bottle during the capping operation, the blades dig into the plastic flange and serve to prevent rotation of the bottle during capping.

After a period of service, the blades tend to wear and the worn blades may slip and strip plastic from the bottle with the result that strings of plastic hang downwardly from the bottle neck, detracting from the appearance of the filled bottle.

As the capping machines operate at extremely high speed, the service life of the blades is relatively short so that the blades must be frequently replaced, resulting in down time for the machine.

As a further problem, certain types of plastic bottles include loop type handles that are located beneath the flange on the bottle neck. The handles prevent the blades from contacting the lower surface of the neck flange so that the blade mechanism for preventing rotation of the bottle cannot be used with bottles of this type.

SUMMARY OF THE INVENTION

The invention is directed to a bottle capping machine and more particularly to a mechanism for preventing rotation of a bottle as a screw cap is applied to the bottle.

The mechanism of the invention includes a rotating table which serves to support a group of bottles and move the bottles sequentially through a series of work stations in the capping machine. The table is formed with a series of circumferentially spaced openings and each bottle is conveyed onto the table and mounted in registry with an opening. The openings have a smaller diameter than the bottles.

The bottles which are preferably formed of plastic, have a cavity or depression in the lower surface and the cavity contains one or more grooves which normally extend in a radial direction.

To prevent rotation of the bottle during the capping operation, a chuck is mounted for movement within each opening between a lower non-chucking position where the chuck is located beneath the surface of the table and an upper chucking position where the chuck engages the cavity in the bottom surface of the bottle. The chuck is provided with one or more ribs or projections which mate with the grooves in the cavity of the bottle, thereby locking the chuck to the bottle and preventing rotation of the bottle.

The chuck is moved between the lower and upper chucking positions by a cam mechanism. In this regard, the chuck is carried on the upper end of a rod which is mounted for sliding movement relative to the table. The lower end of the rod carries a follower that rides on a fixed cam surface. As the follower rides on the high end of the cam, the chuck will be moved upwardly into the chucking position where the ribs on the chuck engage the grooves in the lower cavity of the bottle to thereby hold the bottle against rotation. With the bottle held against rotation, a screw cap can then be applied to the open upper end or neck of the bottle.

If the projections on the chuck are not in full registry with the grooves in the bottle cavity as the chuck is elevated, initial down pressure during the capping operation will cause slight rotation of the bottle to provide full registry of the chuck with the cavity.

The mechanism of the invention provides a positive lock against rotation of the bottle during the capping operation. As the mechanism of the invention does not include any blades or other sharp elements, there is no possibility of damage to the bottle.

As a further advantage, the cam operated chuck mechanism of the invention has an increased service life over an anti-rotation mechanism incorporating blades and can be utilized with bottles having a loop type handle beneath the flange on the bottle neck.

Other objects and advantages will appear during the course of the following description.

DESCRIPTION OF THE DRAWINGS

The drawings illustrate the best mode presently contemplated of carrying out the invention.

In the drawings:

FIG. 1 is a vertical section of a portion of a bottle capping machine showing the mechanism for preventing rotation of the bottle with the chuck shown in the lowered position.

FIG. 2 is a vertical section of the capping machine showing the chuck in the upper or chucking position.

FIG. 5 is a section taken along line 5—5 of FIG. 3.

FIG. 7 is a perspective view of a chuck which can be utilized with the invention.

DESCRIPTION OF THE ILLUSTRATED EMBODIMENT

Figure 3:
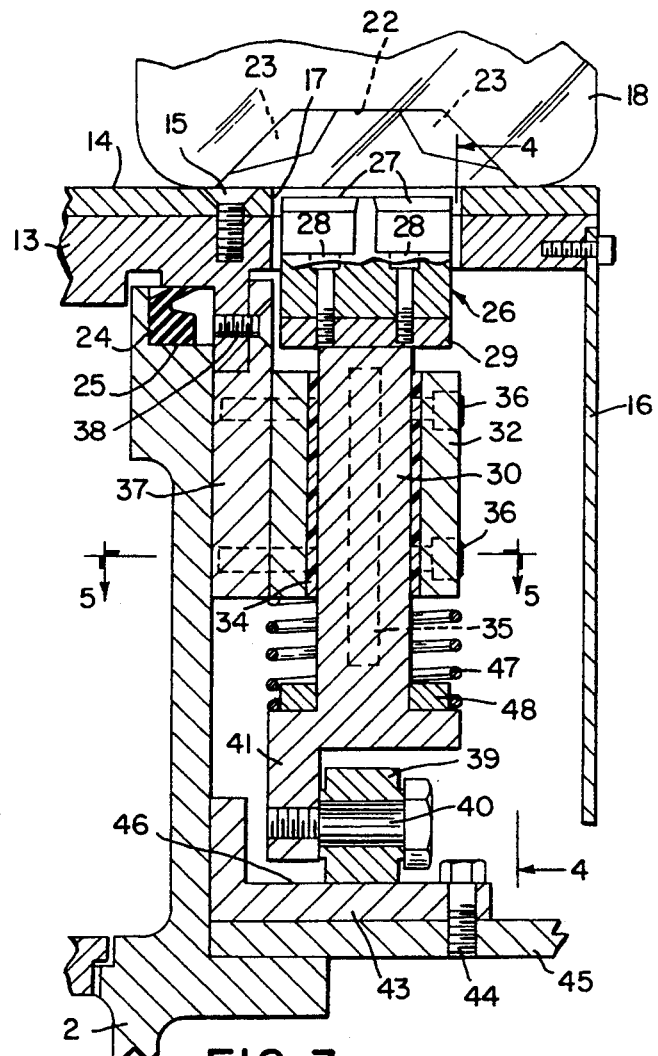
FIG. 3 is an enlarged fragmentary vertical section of the chuck operating mechanism.
Figure 4:
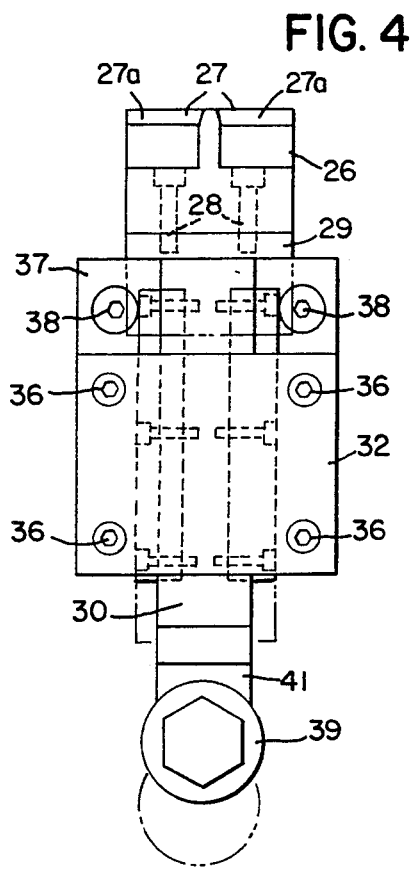
FIG. 4 is a section taken along line 4—4 of FIG. 3.
Figure 6:
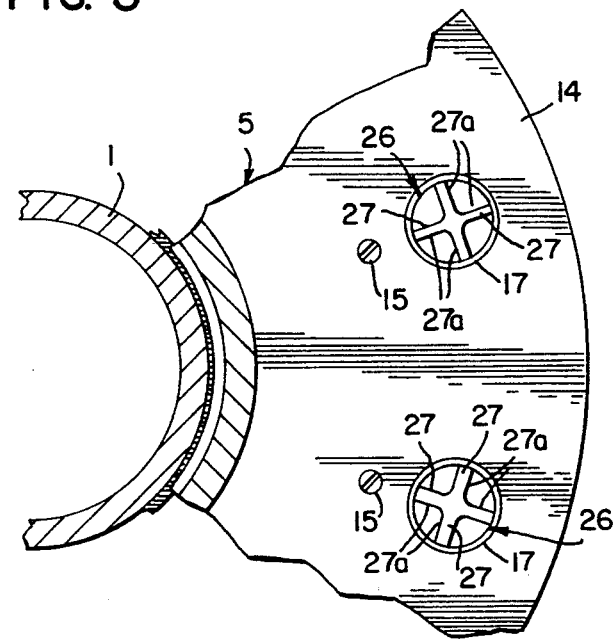
FIG. 6 is a section taken along line 6—6 of FIG. 1 with the bottle removed.

The drawings illustrate a bottle capping machine and in particular, a mechanism for preventing rotation of the bottle as a screw cap is applied to the upper end or neck of the bottles.

The capping machine includes a central tubular shaft 1 and a gear case 2 is connected through bolts to the lower flange 4 of shaft 1.

Mounted for rotation relative to shaft 1 and gear case 2 is a table 5. To journal table 5 relative to shaft 1, a bearing assembly 6 is located between the lower end of table 5 and flange 4 of shaft 1. In addition, a lower bushing 7 is located above bearing 6 in the space between shaft 1 and table 5. An upper bushing, not shown, can also be employed between the upper end of the table 5 and the shaft.

As illustrated, a worm gear drive can be employed to rotate table 5. As shown in FIGS. 1 and 2, the worm gear drive includes a worm 8 which is mounted in the gear case 2 and the worm is engaged by a gear 9 that is mounted in a recess in the lower of table 5 by bolts 10. Rotation of the worm through an external drive, not shown, will cause rotation of table 5 about the axis of shaft 1.

In practice, gear case 2 is partially filled with a lubricant, such as oil, and the gear case is provided with an opening which is enclosed by a sight window 12 so that the level of the lubricant in the gear case can be observed.

An annular flange 13 extends outwardly from the central portion of table 5 and a plate 14 is mounted on flange 13 by a series of screws 15. An annular shield or guard 16, preferably formed of a material such as stainless steel, is supported from the outer periphery of plate 14.

Plate 14 is formed with a series of circumferentially spaced openings 17 and a bottle 18 containing a liquid is mounted on plate 14 in registry with each opening 17. As shown in FIGS. 1 and 2, the diameter of the openings 17 is substantially less than the diameter of the bottles 18.

Bottles 18 are formed of plastic or glass, preferably plastic, and can contain a liquid such as soda, fruit juice, cleaning compositions or the like. The upper end of each bottle 18 defines a neck 19 having a screw thread and a flange or rim 20 projects outwardly from the neck beneath the thread.

The lower end of each bottle 18 is provided with a cavity or depression 22 and the cavity contains one or more radial grooves 23 with the sides of the grooves being inclined. As depicted in the drawings, cavity 22 includes four radial grooves 23. However, depending upon the size and the configuration of the bottle, the shape of the cavity and the grooves can vary.

As the table 5 of the capping machines rotates, a screw cap, not shown, is threaded down on the neck 19 by a standard capping mechanism such as that sold under the name H & J Rotary Capper, Model No. R20IS, and not shown in the drawings. Depending upon the nature of the bottle, the cap may be applied to the threaded neck through as little as one quarter turn or through two or three turns.

To seal the interface between the fixed gear case 2 and the rotating table 5, an annular V seal 24 is mounted within a recess 25 in the upper end of the gear case, as best seen in FIG. 3, and the flexible lip of the seal 24 rides against the under surface of flange 13.

In accordance with the invention, a cam operated chuck mechanism is employed to lock the bottle against rotation as the cap is threaded on the neck 19. The mechanism includes a chuck 26, having a generally cylindrical configuration, that is mounted for movement within each opening 17. The chuck is moved between a lower non-chucking position, as shown in FIG. 1, where the upper surface of the chuck is located beneath the upper surface of plate 14, to an upper chucking position where the chuck is located within the cavity 22 of the bottle.

As best shown in FIG. 7, the chuck is provided with one or more radial ribs or projections 27 which conform to and mate with the grooves 23 in the cavity 22 of bottle 18 when the chuck is in the upper position, thus locking the bottle against rotation. Ribs 27 have inclined side surfaces 27a which conform to the inclined sides of grooves 23 in bottle 18. The upper chucking surface of chuck 26 can take various configurations depending upon the configuration of the cavity 22 in the lower end of the bottle.

To mount the chuck 26 for movement between the lower position and the upper chucking position, the chuck is secured by screws 28 to a mounting disc 29 that in turn is secured to the upper of a rod 30. Rod 30 is mounted for vertical sliding movement in a guide block 32. As best shown in FIG. 5, guide block 32 is generally rectangular in shape and houses a pair of cheek blocks 34, preferably composed of a material having a low coefficient of friction, such as plastic. Blocks 34 are keyed to the rod 30 by a pair of keys 35 which are mounted in aligned slots in the rod and the cheek blocks. Keys 35 permit vertical sliding movement of rod 30 relative to the guide block 32 but prevent rotation of the rod.

Bolts 36 extend through aligned openings in the guide block 32 and respective blocks 34 and are threaded within openings in a support plate 37. The upper end of the support plate 37 is connected to the peripheral edge of table flange 13 by screws 38, as illustrated in FIG. 3. Thus, the chuck 26 as well as rod 30 will rotate with table 5 but can also slide vertically relative to the table.

To move the rod 30 and chuck 26 vertically, a follower 39 is journaled on a stub shaft 40 which is connected to a leg 41 on the lower end of rod 30. Follower 39 is disposed to ride on a fixed annular cam 43 which is connected by bolts 44 to a plate 45. Cam 43 has an upper cam surface 46 having a high portion and a low portion. As the follower 39 rides on the high portion of the cam as shown in FIG. 2, the rod 30 and chuck 26 will 20 be elevated, bringing the chuck into registry with the cavity 22 in the bottle.

To bias the follower into engagement with cam surface 46, a coil spring 47 is located around the lower end of rod 30 and the upper end of the spring bears against the guide block 32 while the lower end of the spring bears against a retainer 48 mounted on the lower end of rod 30. With this construction, the force of spring 47 will urge the follower 39 downwardly into engagement with the cam surface 46.

In operation, each bottle is conveyed onto the rotating plate 14 of table 5 by a conventional star conveyor and is held in position on the table by engagement of the bottle with the arcuate recesses in star guides 49 and 50. The guides serve to locate the bottle in axial alignment with the opening 17. Various types of guides can be provided to provide this function.

At this entry station the chuck 26 is in the lowered position beneath the level of the upper surface of plate 14, as seen in FIG. 1.

As table 5 rotates, the follower 39 rides on the cam surface 46 and as the follower rides toward the high end of the cam surface, the rod 30 and chuck 26 will be elevated moving the chuck into cavity 22 so that the ribs 27 can engage the grooves 23 in the cavity, thus locking the bottle against rotation on plate 14.

With the bottle restrained against rotation, a cap, not shown, can then be applied to the threaded neck 19 of the bottle by a conventional capping mechanism at a capping station.

If the ribs 27 on chuck 26 do not move into full registry with the grooves 23 in cavity 22 as the chuck is elevated, initial down pressure on the bottle caused by the capping mechanism will cause slight rotation of the bottle to bring the ribs into full registry with the grooves and thus prevent further rotation of the bottle. As previously noted, the grooves 23 as well as ribs 27 have inclined side surfaces which facilitates registry of the ribs with the grooves.

Chuck 26 provides a positive lock to the bottle which prevents rotation of the bottle during capping. As the chuck does not include any sharp edges or blades which dig into the surface of the bottle, there is no possibility of damage to the bottle.

As the anti-rotating mechanism of the invention only engages the bottom of the bottle, the mechanism can be utilized with bottles having a loop type handle located directly beneath the flange 20 on neck 19 of the bottle.

Various modes of carrying out the invention are contemplated as being within the scope of the following claims particularly pointing out and distinctly claiming the subject matter which is regarded as the invention.

I claim:

1. A bottle support structure for a bottle capping machine, comprising a rotatable table having an opening therein, said table having a bottle supporting surface disposed to support a bottle in axial alignment with said opening, the bottom of said bottle having a cavity containing at least one groove, a chuck having a chucking surface containing a projection disposed to register with the groove in the cavity of the bottle, mounting means for mounting the chuck for axial movement within said opening from a lower non-chucking position to an upper chucking position where said chucking surface projects above said supporting surface and said projection is disposed to engage said groove to thereby prevent rotation of the bottle relative to said table, and operating means for moving said chuck between said lower and upper positions.

2. The structure of claim 1, and including cap attaching means for attaching a cap to the open upper end of said bottle when said chuck is in said upper position.

3. The structure of claim 1, wherein said operating means comprises a fixed cam surface and a follower connected to said chuck and disposed to ride on said cam surface.

4. The structure of claim 3, wherein said operating means also includes a vertical rod to support said chuck and said follower is mounted for rotation on the lower portion of said rod.

5. The structure of claim 4, and including guide means carried by the table for guiding said rod for vertical movement.

6. The structure of claim 5 and including means for preventing rotation of said rod relative to said guide means.

7. A bottle supporting structure for a bottle capping machine, comprising a rotatable table having at least one opening therein, said table including a bottle supporting surface to support a bottle in axial alignment with said opening, said opening having a smaller diameter than said bottle, said bottle having an open upper end and having a cavity in a lower surface thereof, said cavity having at least one groove therein, a chuck having an upper chucking surface including a projection disposed to register with the groove in said cavity, mounting means for mounting the chuck for axial movement within said opening between a lower position where said chucking surface is located beneath said support surface and an upper chucking position where said chucking surface projects above said support surface and into said cavity and said projection registers with said groove to prevent rotation of the bottle on said table, a fixed cam surface, and a follower connected to said chuck and disposed to ride on said cam surface to thereby move said chuck between lower and upper positions.

8. The structure of claim 7, wherein said table is mounted for rotation about a vertical axis and said table includes a plurality of circularly spaced openings, said table disposed to support a plurality of bottles each disposed in axial alignment with an opening.

9. The structure of claim 7, wherein said chuck includes a plurality of radial projections disposed to register with radial grooves in the cavity of the bottle.

10. The structure of claim 8, wherein said cam surface includes a high area and a low area disposed at a level beneath said high area, movement of said follower from said low area to said high area causing said chuck to move from said lower position to said upper position.

11. The structure of claim 7 and including cap attaching means for attaching a threaded cap to the open upper end of the bottle when the chuck is in the upper position.

12. A method of capping a bottle, comprising the steps of mounting a bottle on a rotatable table in axial registry with an opening in said table, said bottle having an open upper end and having a cavity in a lower surface thereof and having at least one groove in said cavity, moving a chuck upwardly through said opening into said cavity and engaging a projection on said chuck with said groove to lock the bottle against rotation on said table, and connecting a cap to the open upper end of the bottle while said bottle is held against rotation.

13. The method of claim 12, and including the step of forming the bottle with a screw thread around the open upper end, said step of connecting a cap comprising the step of screwing the cap onto said thread.

14. The method of claim 13, and including the step of rotating the table about a vertical axis, said step of moving a chuck comprising engaging said chuck with a cam surface as said table is rotated to move said chuck between a lower position beneath said table and an upper position where said chuck is located within said cavity.

* * * * *